(12) United States Patent
Makofka

(10) Patent No.: US 7,818,401 B2
(45) Date of Patent: Oct. 19, 2010

(54) METHOD AND APPARATUS FOR PROVIDING DECENTRALIZED LOAD DISTRIBUTION

(75) Inventor: Douglas Makofka, Willow Grove, PA (US)

(73) Assignee: General Instrument Corporation, Horsham, PA (US)

( * ) Notice: Subject to any disclaimer, the term of this patent is extended or adjusted under 35 U.S.C. 154(b) by 23 days.

(21) Appl. No.: 11/021,168

(22) Filed: Dec. 23, 2004

(65) Prior Publication Data

US 2006/0143283 A1   Jun. 29, 2006

(51) Int. Cl.
*G06F 15/16* (2006.01)
*G06F 15/173* (2006.01)
*G06F 9/46* (2006.01)

(52) U.S. Cl. ............... 709/219; 709/203; 709/243; 709/226; 709/223; 709/225; 718/105

(58) Field of Classification Search ........... 709/223, 709/225, 237, 243, 229, 203, 219, 226; 718/105, 718/106
See application file for complete search history.

(56) References Cited

U.S. PATENT DOCUMENTS

| | | | | |
|---|---|---|---|---|
| 5,031,089 A * | 7/1991 | Liu et al. | ............ | 709/226 |
| 5,862,348 A * | 1/1999 | Pedersen | ............ | 709/229 |
| 6,018,771 A * | 1/2000 | Hayden | ............ | 709/231 |
| 6,115,752 A * | 9/2000 | Chauhan | ............ | 709/241 |
| 6,374,289 B2 * | 4/2002 | Delaney et al. | ............ | 709/203 |
| 6,463,454 B1 * | 10/2002 | Lumelsky et al. | ............ | 718/105 |
| 6,606,643 B1 * | 8/2003 | Emens et al. | ............ | 709/203 |
| 6,748,416 B2 * | 6/2004 | Carpenter et al. | ............ | 709/202 |
| 6,751,612 B1 * | 6/2004 | Schuetze et al. | ............ | 707/4 |
| 6,785,704 B1 * | 8/2004 | McCanne | ............ | 718/105 |
| 7,103,586 B2 * | 9/2006 | Holenstein et al. | ............ | 707/1 |
| 7,155,515 B1 * | 12/2006 | Brown et al. | ............ | 709/226 |
| 7,231,460 B2 * | 6/2007 | Sullivan et al. | ............ | 709/246 |
| 2005/0262241 A1 * | 11/2005 | Gubbi et al. | ............ | 709/225 |
| 2006/0028995 A1 * | 2/2006 | Canoy et al. | ............ | 370/252 |
| 2006/0074925 A1 * | 4/2006 | Bixby et al. | ............ | 707/100 |

OTHER PUBLICATIONS

"Decentralized Load Balancing Algorithm for Dynamic Computer Networks", Dec. 1991, IBM Technical Disclosure Bulletin, US TDB-ACC-No. NA9112221, pp. 1-2.*

* cited by examiner

*Primary Examiner*—Ario Etienne
*Assistant Examiner*—Gregory G Todd
(74) *Attorney, Agent, or Firm*—Stewart M. Wiener

(57) ABSTRACT

The present invention discloses a method and apparatus for providing decentralized load sharing, e.g., providing a protocol that can be used to address load balancing without the need of a central proxy device. Specifically, in one embodiment, the present invention addresses the decentralized load sharing problem, by allowing a group of servers to detect when more than one server attempts to process the same "work request" from a client. To address the potential conflict, each server will implement a back-off strategy for negotiating which server will actually process the work request.

10 Claims, 3 Drawing Sheets

METHOD AND APPARATUS FOR PROVIDING DECENTRALIZED LOAD DISTRIBUTION

BACKGROUND OF THE INVENTION

1. Field of the Invention

Embodiments of the present invention generally relate to a load balancing method. More specifically, the present invention relates to a method and apparatus for providing decentralized load sharing, e.g., providing a protocol that can be used to address load balancing without the need of a central proxy device.

2. Description of the Related Art

With the proliferation of distributed environments, where desired resources and/or information may be distributed across a complex network of servers and autonomous systems, it has become increasingly difficult to manage load sharing. Typically, a system or network may employ a central proxy device that is in communication with a plurality of servers, where the central proxy device is tasked with controlling work distribution among the servers. Typically, there is tight synchronization among the servers in the system. Although this approach is effective in some implementations, as the client/server environment continues to expand, this centralized approach becomes impractical, i.e., it does not scale well as the client/server environment continues to grow. It is also vulnerable to attack or failure, e.g., the load balancing function will cease to operate if the central proxy device is attacked or suffers a failure.

Thus, there is a need in the art for a method and apparatus that can provide decentralized load sharing, e.g., providing a protocol that can be used to address load balancing without the need of a central proxy device.

SUMMARY OF THE INVENTION

In one embodiment, the present invention discloses a method and apparatus for providing decentralized load sharing, e.g., providing a protocol that can be used to address load balancing without the need of a central proxy device. Specifically, in one embodiment, the present invention addresses the decentralized load sharing problem, by allowing a group of servers to detect when more than one server attempts to process the same "work request" from a client. To address the potential conflict or collision, each server will implement a back-off strategy for negotiating which server will actually process the work request. Specifically, each server is implementing a protocol that allows requests to be multicast/broadcast to a group of loosely coupled servers. In turn, each server can then autonomously decide whether to process the request or not.

This approach is implemented without the need of a central proxy device to coordinate work distribution. Thus, the present invention is resilient and is immune to failure in that the work distribution is not centrally located. If one server fails, other available servers simply continue to coordinate work distribution without the failed server.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

Figure 1:
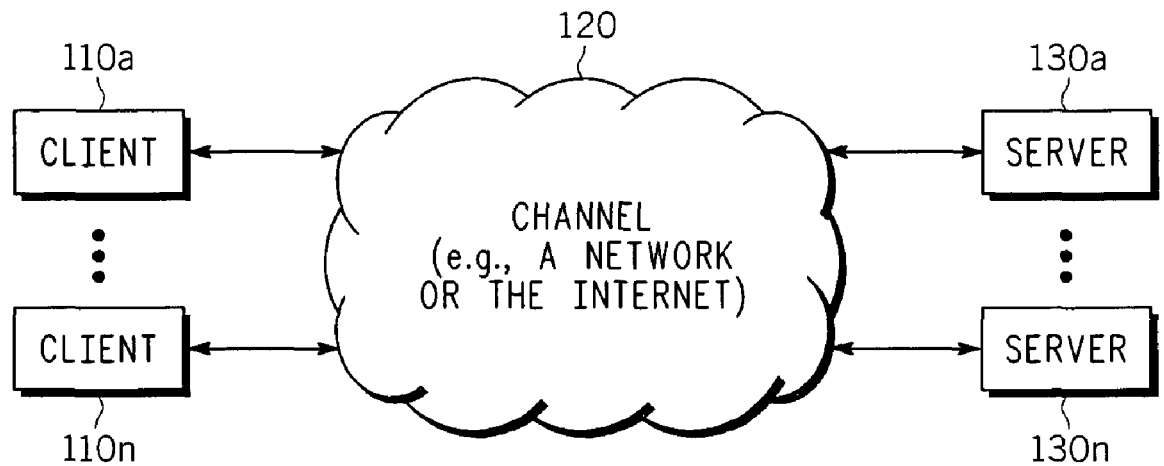
FIG. 1 illustrates a system of the present invention.

FIG. 1 illustrates an illustrative system 100 of the present invention. In one embodiment, the system comprises a plurality of clients 110*a*-110*n* (collectively referred to as clients 110), a communication channel 120, and a plurality of servers 130*a*-130*n* (collectively referred to as servers 130). The clients are devices that are making requests that will be serviced by one of more servers. For example, the clients can be set top boxes or residential gateways that are requesting media streams, e.g., movies and videos from a media service provider. In turn, the servers 130 own by the media service provider can be a plurality of media servers capable of delivering the requested media streams as requested by the clients.

Alternatively, the client may be a computer that is requesting data on the internet, e.g., channel 120, where the requested data is available on a plurality of servers that are in a distributed environment. It should be noted that the labels "client" and "server" are only illustrative of their functions in a particular context. A node may behave as a client in one context, while behaving as a server in another context. Thus, clients and servers in the present disclosure can be broadly defined as peer nodes.

The channel 120 is a broadcast/multicast channel. Namely, the channel 120 basically duplicates a request from a client and sends the request to every server that is associated with the channel. As such, the channel is intended to broadly cover a network or one or more broadcast nodes that are implementing a broadcast/multicast protocol such as Internet Group Management Protocol (IGMP) and the like. IGMP is a standard for IP multicasting in the Internet. For example, IGMP can be used to establish host memberships in particular multicast groups on a single network. The mechanisms of the protocol allow a host to inform its local router, using host membership reports, that it wants to receive messages addressed to a specific multicast group.

It should be noted that channel 120 may actually comprise a plurality of different channels in certain implementations. Thus, a client may actually have a plurality of different channels to select from in sending its request, where each channel is associated with a different set of servers.

Figure 2:
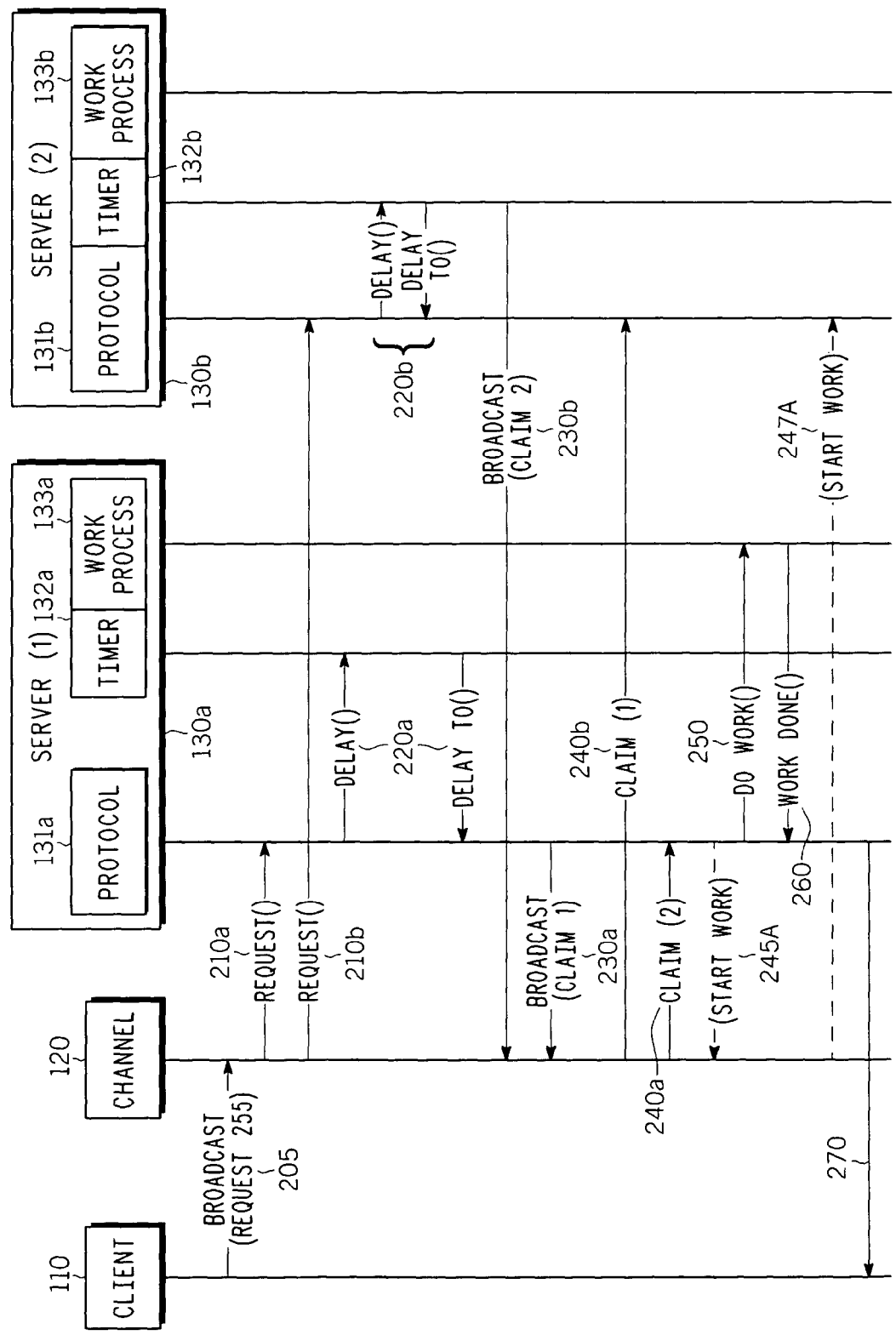
FIG. 2 illustrates a protocol flow of the present invention.

FIG. 2 illustrates a protocol flow 200 of the present invention. Specifically, FIG. 2 illustrates a client sending a request that will be broadcasted to a plurality of servers for service. In this example, only two servers are illustrated, but it should be noted that any number of servers may receive the client request 205.

In one embodiment, request 205 is duplicated into a request 210*a* that is broadcasted to server(1) 130*a*, where request 205 is also duplicated into a request 210*b* that is broadcasted to server(2) 130*b*. The servers 130*a* and 130*b* are both capable of servicing the request from the client 110.

To aid in the understanding of the present invention, each of the servers 130a and 130b is illustrated as having at least three modules, a protocol module 131a-b, a timer module 132a-b, and a work process module 133a-b. The protocol module is illustrated as implementing the present communication protocol. The timer module is illustrated as implementing a timer function. The work process module is illustrated as implementing the work process or function of servicing the request. Although shown as separate modules, those skilled in the art will realize that the present invention is hot so limited. Namely, these functions can be implemented using one or more modules.

When each server received the broadcasted request via the protocol module, each server will delay for a period of time 220a or 220b via the timer module before attempting to announce or to claim the right to service the request from client 110. This delay is useful because it allows the broadcasted request to reach all available servers and it also serves as a mechanism to avoid collision between the servers.

To illustrate, in one embodiment, the delay in each server is arbitrarily or randomly generated. Alternatively, the delay may also be generated in accordance with a measure of busyness of the server. For example, the calculated delay can be computed as follows:

$$\text{Delay} = \text{random delay}(\ ) + (\text{busyness} \times C), \quad \text{(EQU. 1)}$$

where random delay( ) is a randomly generated delay value, busyness is a measure of how busy is the server (e.g., current CPU usage in terms of percentage) and C is a predefined time value. Thus, if a randomly generated delay value is 0.05 seconds and the CPU usage is 50% and C is one second, then the calculated delay is (0.05+(0.5×1)=0.55 seconds). It should be noted that other busyness measures can be used instead of CPU usage, e.g., the number of queued requests, the estimated time before the new request can be serviced, the complexity of the current request and so on.

Returning to FIG. 2, server(1) announces a claim 230a to service the request, whereas server(2) announces a claim 230b to service the request as well. Both announcements are received by the channel 120, which, in turn, again broadcasts both "claim" announcements 240a and 240b to all the servers.

Thus, server(1) is made aware that server(2) has made an announcement of its intention to service the request. Similarly, server(2) is also made aware that server(1) has made an announcement of its intention to service the request. At this point, a potential collision has been detected by both servers. To resolve this conflict, both servers will evaluate the ranking of the server issuing the claims. For example, in this particular example, server(1) has been predefined to be a higher rank server than server(2). The ranking of the servers can be implemented when each server joins the network or is assigned by an administrator of the system.

Since server(1) realizes that the potential collision is with a lower ranked server, server(1) will actually commence servicing 250 the request, e.g., retrieving the requested data 260 using work process module 133a. In turn, server(1) will forward the requested data 270 to channel 120 which will then forward the requested data to client 110.

Since server(2) realizes that the potential collision is with a higher ranked server, server(2) will ultimately decline to service the request. In one embodiment, server(2) simply will not respond to the request even though it has previously announced a claim to service the request.

Alternatively, server(2) may optionally announce a relinquish of claim to the channel which, in turn, will then broadcast the relinquish announcement to all the servers. Namely, other servers will see that server(2) will not attempt to service the request.

Alternatively, server(1) may also optionally announce 245a that it has commenced with serving the request. In turn, the channel will broadcast the commencement announcement 247a to all the servers. This additional announcement may be necessary in embodiments where delay or congestion in the channel 120 may cause inconsistency. For example, if server (2) has a very short delay (e.g., it is not very busy) and announces a claim to service the request, and the channel is somehow congested and delayed in broadcasting server(1)'s claim to service the request, then it may be possible that server(2) could have started to service the request before server(2) was made aware that a higher ranked server has also announced its intention to service the request. Since server(2) has already commenced the process of servicing the request, it may be impractical to stop the process and to allow server (1) to service the request. Thus, when server(2) announces that it has commenced with serving the request, server(1) will now be made aware that a lower ranked server has actually commenced serving the request. Detecting this conflict, server(1) will relinquish the claim and will allow server(2) to complete the servicing of the request.

Figure 3:
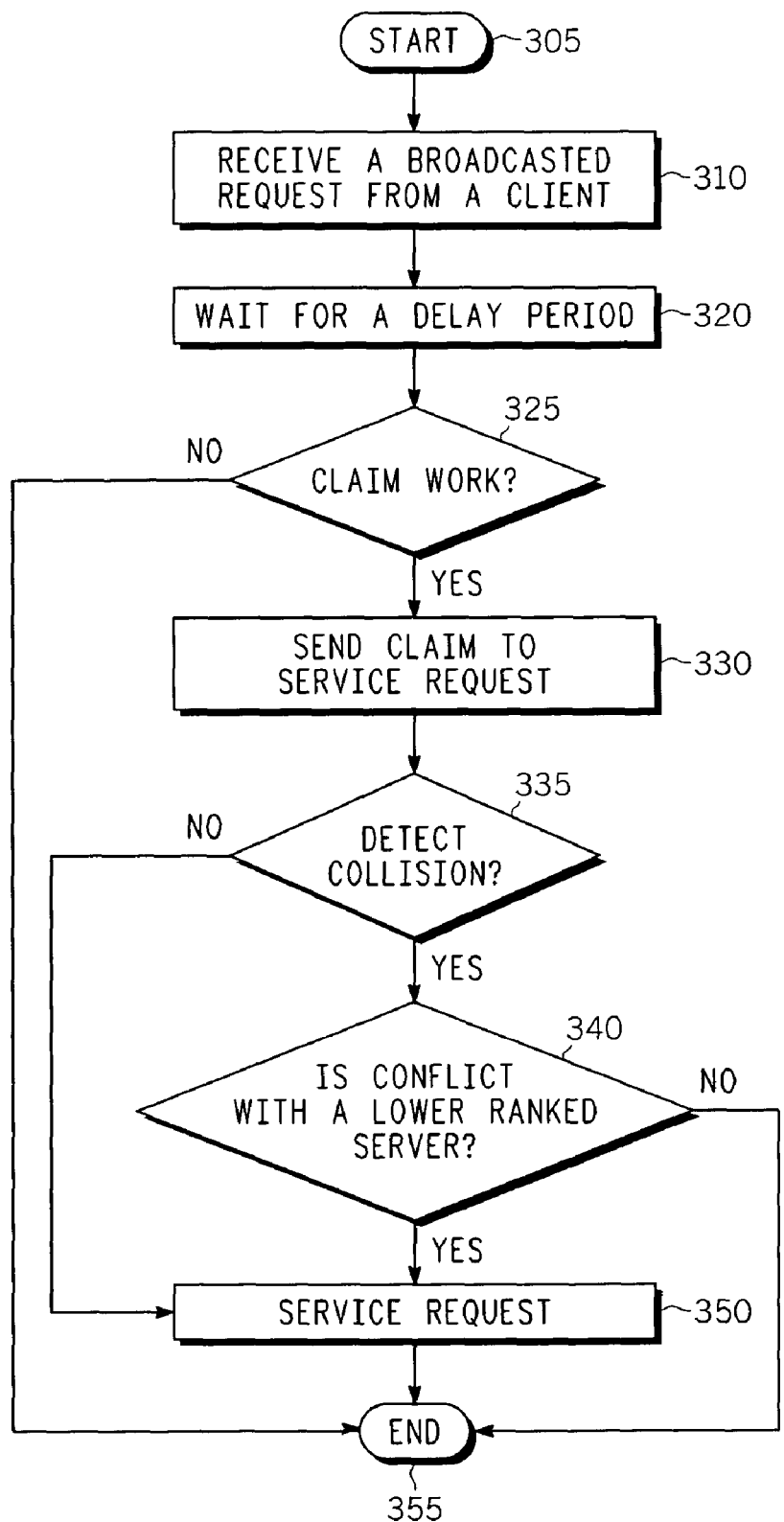
FIG. 3 illustrates a flowchart of a method for providing decentralized load balancing in accordance with the present invention.

FIG. 3 illustrates a flowchart of a method 300 for providing decentralized load balancing in accordance with the present invention. Namely, FIG. 3 illustrates the method that is implemented in each of the servers 130.

Method 300 starts in step 305 and proceeds to step 310 where the method receives a broadcasted request from a client. In step 320, the method will wait or delay for a period of time. In one embodiment, the delay period is simply randomly generated. In another embodiment, the delay period is calculated in accordance with equation 1 as discussed above.

In step 325, the method will determine whether to claim the work of servicing the request. If the query is negatively answered, then the method will end in step 355, e.g., the server is simply too busy to service the request. If the query is positively answered, then the method will proceed to step 330, e.g., the server has resources to service the request.

In step 330, the method will announce a claim to service the request. The announcement is directed towards the channel, which, in turn, will broadcast the claim announcement to all other servers associated with the channel.

In step 335, the method determines whether a collision is detected. Namely, the method is determining whether a conflicting claim announcement has been received for the same client request. If the query is negatively answered, then the method proceeds to step 350, e.g., the server did not detect any potential collision. If the query is positively answered, then the method will proceed to step 340, e.g., the server did receive a conflicting claim announcement from another server who wants to service the same client request.

In step 340, the method will attempt to resolve the potential collision, e.g., it will determine whether the potential collision is with a lower ranked server. If the query is negatively answered, then the method proceeds to step 355, e.g., the server determines that a higher ranked server has claimed the work for serving the request. If the query is positively answered, then the method will proceed to step 350, e.g., the server determines that a lower ranked server has attempted to claim the work for serving the request. As such, the server will ignore the conflict and will simply service the request.

Figure 4:
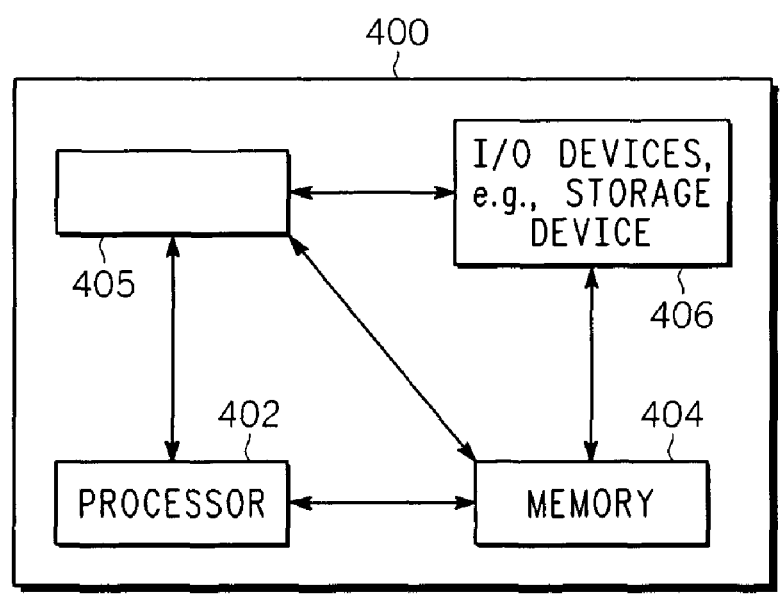
FIG. 4 illustrates the present invention implemented using a general purpose computer.

FIG. 4 is a block diagram of the present decentralized load balancing system being implemented with a general purpose computer. In one embodiment, the decentralized load balancing system 400 is implemented using a general purpose computer or any other hardware equivalents. More specifically, the decentralized load balancing system 400 comprises a processor (CPU) 402, a memory 404, e.g., random access memory (RAM) and/or read only memory (ROM), a decentralized load balancing module 405, and various input/output devices 406 (e.g., storage devices, including but not limited to, a tape drive, a floppy drive, a hard disk drive or a compact disk drive, a receiver, a transmitter, a speaker, a display, an output port, a user input device (such as a keyboard, a keypad, a mouse, and the like), or a microphone for capturing speech commands).

It should be understood that the decentralized load balancing module 405 can be implemented as physical devices or subsystems that are coupled to the CPU 402 through a communication channel. Alternatively, the decentralized load balancing module 405 can be represented by one or more software applications (or even a combination of software and hardware, e.g., using application specific integrated circuits (ASIC)), where the software is loaded from a storage medium (e.g., a magnetic or optical drive or diskette) and operated by the CPU in the memory 404 of the computer. As such, the decentralized load balancing module 405 (including associated data structures) of the present invention can be stored on a computer readable medium or carrier, e.g., RAM memory, magnetic or optical drive or diskette and the like.

While the foregoing is directed to embodiments of the present invention, other and further embodiments of the invention may be devised without departing from the basic scope thereof, and the scope thereof is determined by the claims that follow.

The invention claimed is:

1. A method for servicing a request by a first server, comprising:
    receiving a broadcasted request from a client;
    delaying for a period of time, wherein said period of time is calculated from a measure of busyness of a server;
    announcing a claim for servicing the entire request that includes a first ranking of the first server;
    receiving a second claim from a second server for servicing the entire request that includes a second ranking of the second server;
    determining, by the first server, whether a potential collision has been detected for serving the entire request by evaluating the first ranking of the first server against the second ranking of the second server;
    servicing the request if said potential collision is resolved in the first server's favor; and
    not servicing the request if said potential collision is not resolved in the first server's favor.

2. The method of claim 1, wherein said period of time is based on a randomly generated period of time.

3. The method of claim 1, further comprising: announcing a commencement of servicing the request.

4. The method of claim 1, wherein said broadcasted request is received in accordance with Internet Group Management Protocol.

5. The method of claim 1, wherein said broadcasted request is received from a broadcast channel.

6. A non-transitory computer-readable medium having stored thereon a plurality of instructions, the plurality of instructions including instructions which, when executed by a first processor, cause the first processor to perform a method for servicing a request, comprising:
    receiving a broadcasted request from a client;
    delaying for a period of time, wherein said period of time is calculated from a measure of busyness of a server;
    announcing a claim for servicing the entire request that includes a first ranking of the first processor;
    receiving a second claim from a second processor for servicing the entire request that includes a second ranking of the second processor;
    determining, by the first processor, whether a potential collision has been detected for serving the entire request by evaluating the first ranking of the first processor against the second ranking of the second processor;
    servicing the request if said potential collision is resolved in the first processor's favor; and
    not servicing the request if said potential collision is not resolved in the first processor's favor.

7. The computer-readable medium of claim 6, wherein said period of time is based on a randomly generated period of time.

8. The computer-readable medium of claim 6, further comprising announcing a commencement of servicing the request.

9. The computer-readable medium of claim 6, wherein said broadcasted request is received in accordance with Internet Group Management Protocol.

10. The computer-readable medium of claim 6, wherein said broadcasted request is received from a broadcast channel.

* * * * *